Sept. 22, 1942.   W. B. JOHNSON   2,296,789
RETRACTABLE AUXILIARY TRAILER WHEEL MOUNTING
Filed Nov. 7, 1941
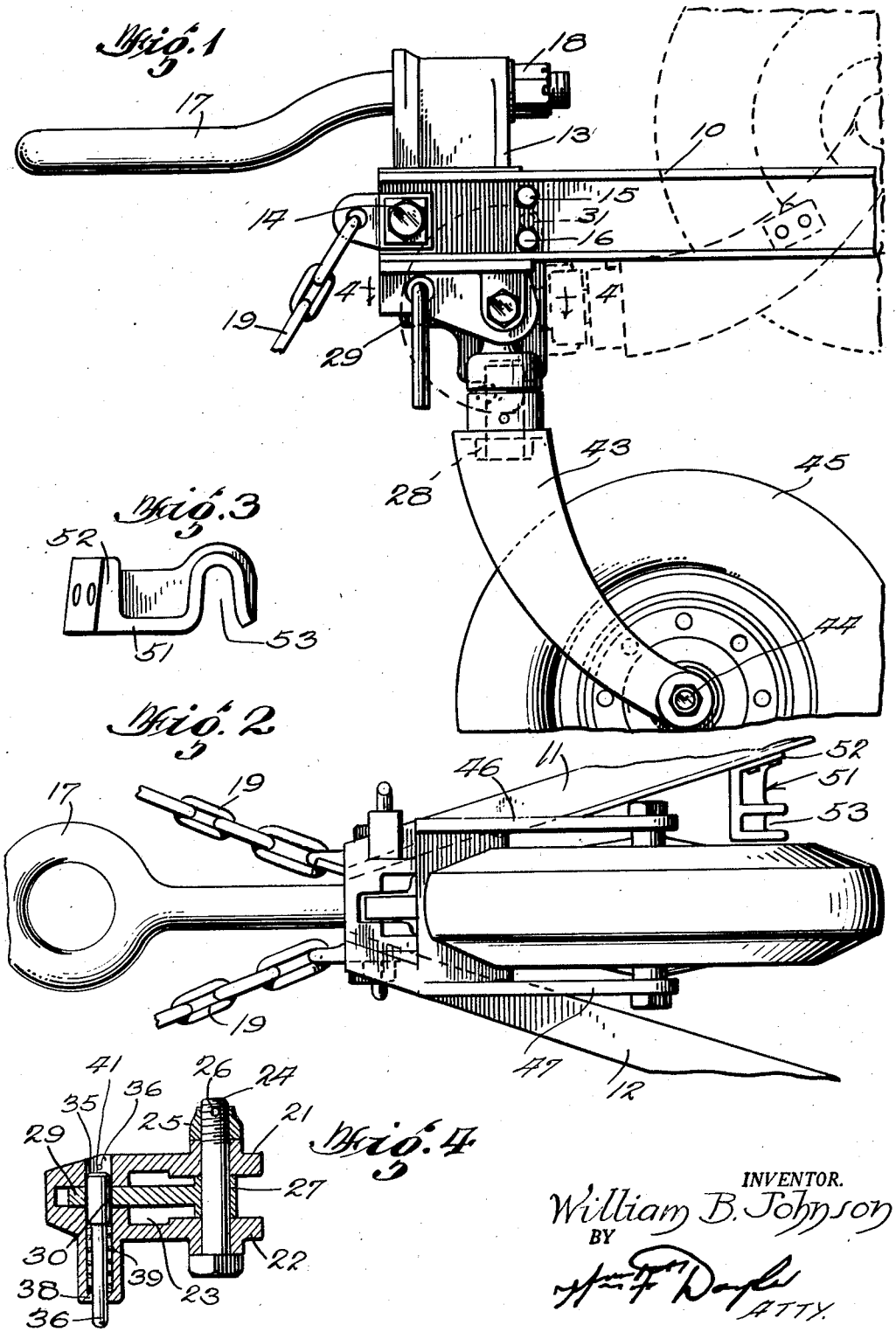
INVENTOR.
William B. Johnson
BY
ATTY.

Patented Sept. 22, 1942

2,296,789

UNITED STATES PATENT OFFICE 2,296,789

RETRACTABLE AUXILIARY TRAILER WHEEL MOUNTING

William B. Johnson, United States Army

Application November 7, 1941, Serial No. 418,133

3 Claims. (Cl. 280—33.4)

(Granted under the act of March 3, 1883, as amended April 30, 1928; 370 O. G. 757)

The invention described herein, if patented, may be manufactured and used by or for the Government for governmental purposes without the payment of any royalty thereon.

The present invention relates to a motor vehicle trailer, and more particularly to a retractable auxiliary trailer wheel mounting particularly adapted for use on a military cargo trailer.

The invention here disclosed has been developed to meet present military requirements of the United States Army, and while it is believed to be particularly valuable for military purposes, its utility is not limited thereto and is believed to extend to commercial trailer adaptations, as well.

It is the prime object of the present invention to provide an improved auxiliary wheel mounting for trailers of the conventional two-wheel type to permit an auxiliary front wheel to be raised in a protected position when in use so that the forward end of the trailer may be carried by a draw bar affixed to the rear of a motor vehicle, the arrangement being such that the trailer wheel may be easily and quickly lowered into engagement with the ground to permit the trailer to be manually rolled and shifted from place to place when not being carried by the prime mover vehicle.

A further object of the invention is to provide an improved retractable trailer wheel including a caster pivot to facilitate manual shifting and steering of the trailer and reduce the manual effort required to shift the trailer when not supported by the prime mover.

A further object of the invention is to provide a retracting pivot upon which the trailer wheel and its mounting may be shifted between an operative and an inoperative position, and means to positively maintain said trailer wheel in either of the aforementioned positions.

A further object of the invention is to provide a wheel retaining clip in combination with a pivotally mounted retractable trailer wheel to prevent unnecessary shifting of the trailer wheel due to the motion of the vehicle when the wheel is secured in its inoperative position.

These and other important objects are accomplished in the present invention by providing an auxiliary trailer wheel mounted on a fork and somewhat offset from a vertical kingpin to provide the desired caster effect. The vertical kingpin is in turn mounted on a horizontal pivot provided with a two-position index plate so that the kingpin may be locked in its vertical position with the wheel in engagement with the ground or may be shifted upwardly to lift the wheel sufficiently high above the ground surface to prevent any interference with the normal functioning of the trailer, as when it is supported by a draw bar secured to the rear of a truck.

Referring now more particularly to the drawing,

Fig. 1 is a fragmental side elevational view of the forward end of a trailer constructed in accordance with the teachings of this disclosure.

Fig. 2 is a bottom plan view of the trailer structure illustrated in Fig. 1.

Fig. 3 is a detail view of the fork-retaining clip attached to the trailer frame.

Fig. 4 is a detail sectional view through the horizontal pivot and indexing pin and is taken substantially on the plane of the line 4—4 in Fig. 1.

The structure hereinafter described may be utilized to advantage in connection with trailers of numerous different designs and constructions, but it is contemplated that one of its typical uses will be in connection with a standard one-ton miltary cargo trailer including a cargo body and a pair of wheels, one on each side of the body. In such constructions, the trailer frame 10 is usually extended forwardly of the cargo body so that each of the side members 11 and 12 of the frame will meet at their forward ends so that they may each be bolted to a common front casting 13 by a plurality of bolts 14, 15 and 16. It is contemplated that the forward end of the trailer will be secured to and supported by some type of prime mover by a forwardly extending draw bar, here illustrated in the form of an eyebolt 17 secured to the casting 13 by the threaded nut 18. A pair of safety chains 19 are also ordinarily attached between the trailer frame and the prime mover for purposes well understood in the art.

In modern military operations, the use of these trailers is by no means limited to carrying ordinary cargoes, but extends also to the use of such trailers as independent military units, as, for example, radio, telephone, or other signal units, gasoline dispensers, power-generating plants, etc. For example, when one of the trailers is equipped as a gasoline dispensing unit, it will be equipped with hose lines, gasoline pumps and dispensing nozzles, while if it is to be used as a field power plant, the trailer will have mounted therein a gasoline engine and generator, together with lights, flexible conduits, electrical cables, and other necessary equipment, to establish connection with and energize any electrical devices used in the field. Such units as these will ordinarily be moved from place to place in the field by prime movers, but it is also desirable that they be so designed and constructed that they may be manually shifted for short distances around the encampment. In this connection, it will be understood, of course, that the weight of the equipment in the trailers will prevent them from being easily shifted by man power alone, unless the rear wheels are supplemented by an auxiliary front wheel to provide a tricycle arrangement.

To provide a suitable auxiliary wheel, the front casting 13 is formed to include the two side walls 21 and 22 shaped to define a central chamber 23 and a horizontal bolt 24 extends through the walls 21 and 22 and is secured in position by a nut 25 and cotter pin 26. The bolt 24 serves a horizontal pivot for a mounting plate 27 to which a kingpin bolt 28 is secured. The kingpin bolt 28 normally extends downwardly in vertical position with respect to the ground, but the member 27 is provided with an arcuate indexing plate 29 having a pair of indexing apertures 30 and 31 respectively, so that the kingpin 28 may be locked in either a vertical or a horizontal position. An indexing pin 35 is slidably mounted in a horizontal transverse bore 36 so that it may engage either the indexing opening 30 to secure the kingpin 28 in horizontal position or may engage the opening 31 to secure the kingpin 28 in horizontal position. The indexing pin 35 is provided with a reduced handle portion 36 which extends outwardly through the reduced end portion 38 of the bore 36 and is bent to form a convenient hand grip. A compression spring 39 is telescoped over the reduced portion and is arranged to urge the indexing pin 35 into the opening 30 or 31 of the indexing plate. If desired, a limit stop 41 in the form of a transverse pin may be inserted in the bore 36.

A wheel fork 43 is supported on the kingpin bolt 28 and is arranged to extend downwardly and rearwardly to support the axle 44 of the trailer wheel 45. It will be understood, of course, that the fork 43 includes two arms 46 and 47 extending downwardly on either side of the wheel 45 to support both ends of the axle 44 and thus give the mounting of the wheel 45 ample strength to withstand the load of the vehicle.

A wheel retaining bracket 51 is mounted on the inner surface of one of the frame members 11 by bolts extending through the flange 52 and a socket 53 is arranged and formed at the outer end of the bracket 51 in position immediately above and in alignment with the arm 46 of the wheel fork 43.

The operation of the mechanism is as follows:

When the trailer is to be towed by a prime mover vehicle, the draw bar 17 is secured to the vehicle and the trailer wheel 45 is lifted from the ground to the dotted line position illustrated in Fig. 1. This is accomplished manually and as the operator lifts the wheel 45 into its dotted line position, he will position the arm 46 of the wheel fork 43 within the socket 53 of the bracket 51, so that the bracket 51 acts as an upward limit for the movement of the wheel structure and the socket 53 prevents lateral shifting of the fork and wheel. As the parts reach this position, the compression spring 39 will urge the indexing pin 35 into engagement with the opening 30 of the indexing plate 29 and will lock the entire wheel mounting structure against return movement.

The trailer wheel will remain in this position as long as the trailer is being moved by a prime mover and it will be noted that at this time the entire wheel structure and its mounting are well above the surface of the ground and will in no way interfere with the normal operation of the trailer.

When the trailer is to be disconnected from the prime mover, however, it is only necessary for the operator to withdraw the indexing pin 35 by manually gripping the handle 36 and retracting it against the tension of the coil spring 39. When this is done, the wheel will fall by gravity into a solid line position and upon release of the handle 36 the indexing pin 35 will snap into position in the orifice 30 of the indexing plate 29 and again lock the mechanism in position. The weight of the vehicle at this time will be borne largely by the rear wheels of the trailer but inasmuch as the center of the cargo body is customarily positioned somewhat forwardly of the rear wheel, a portion of the weight will be carried by the forward wheel 45. With this arrangement, the trailer may be easily shifted small distances around a military camp by manual effort alone since the caster effect of the front fork 43 will permit easy lateral shifting of the forward end of the trailer and the entire weight of the trailer and its cargo will ordinarily not be so great as to prevent it from being manually rolled from place to place. The advantages of such a construction are well recognized in military circles, since while it is entirely practical to attach trailers of this character to motorized vehicles for transporting them over comparatively great distances, it is not feasible to utilize a structure that requires the presence of a motorized prime mover to shift them a few yards either way around an encampment or to position them in the most convenient location with respect to other related equipment. By practicing the teachings of this invention, however, it is possible to provide a trailer having an auxiliary wheel so arranged that it may be easily and quickly shifted from its operative to its inoperative position so that the trailer will be well adapted to either manual or motorized movement.

A practical design and construction illustrated in the drawing comprises a present preferred embodiment of the invention in the form in which it has been developed by army engineering experts and adopted for use in the United States Army. It is recognized, however, that numerous modifications and variations of the exact details of structure may be accomplished without departing from the true spirit of the invention, and it should therefore be regarded as limited only by the scope of the appended claims.

Having thus described my invention, what is claimed as new and desired to secure by Letters Patent, is:

1. In an auxiliary wheel mounting for a trailer, a wheel mounting element secured in fixed relationship with the trailer frame, said wheel mounting element including a central cavity and a pair of opposed side walls on opposite sides of and defining said central cavity, a horizontal pivot bolt extending through each of said side walls and through said cavity and secured in position with respect to said mounting element, a shiftable wheel supporting element pivotally mounted on said horizontal bolt and including arcuate indexing plate housed within the aforementioned central cavity and adapted to be shifted between an operative and an inoperative position, said indexing plate having indexing notches corresponding with said operative and inoperative positions; a spring-urged indexing member shiftably associated with said wheel mounting element and adapted to selectively engage either of said indexing notches and to positively lock said indexing plate against movement when engaged in either of said notches; a kingpin associated with said shiftable wheel support and arranged to be shifted with said wheel support to assume a vertical position or a raised position; a bifurcated wheel fork pivotally secured to said kingpin for free pivotal movement thereon, said fork including a pair of offset supporting arms adapted to extend on either side of a vehicle wheel to support the opposite ends of the wheel axle; a vehicle wheel and axle supported by said fork, and a retaining clip secured to the trailer frame to receive the vehicle fork as it approaches its inoperative position and to prevent lateral shifting movement of said wheel and fork while the indexing plate is located in its inoperative position.

2. In an auxiliary wheel mounting for a trailer, a wheel mounting element secured in fixed relationship with the trailer frame, a horizontal pivot bolt, a shiftable wheel supporting element pivotally mounted on said horizontal bolt and including arcuate indexing plate adapted to be shifted between an operative and an inoperative position, said indexing plate having indexing notches corresponding with said operative and inoperative positions, an indexing member shiftably associated with said wheel mounting element and adapted to selectively engage either of said indexing notches and to positively lock said indexing plate against movement when engaged in either of said notches; a kingpin associated with said shiftable wheel support and arranged to be shifted with said wheel support to assume a vertical position or a raised position, a wheel support pivotally secured to said kingpin for free pivotal movement thereon, a vehicle wheel supported by said fork, and a retaining clip secured to the trailer frame to receive the wheel support as it approaches its inoperative position, said clip including a notch to receive the wheel support and prevent lateral shifting movement of said wheel and fork while the indexing plate is located in its inoperative position.

3. In a trailer, in combination, a frame element, a draw bar extending forwardly from said frame element, and adapted for connection with a prime mover, and an auxiliary retractable wheel including a pivot, a fork and a wheel, a shiftable mounting for said fork and wheel, including indexing mechanism whereby said mounting may be locked in an operative position or shifted to an inoperative position, and means to restrain the wheel and fork structure against shifting movement when said wheel is carried in inoperative position, said means including a retaining slip secured to the trailer frame to receive the wheel fork as it approaches its inoperative position, said clip including a notch to receive the wheel fork and prevent lateral shifting of said wheel and fork while the indexing mechanism is located in its inoperative position.

WILLIAM B. JOHNSON.